US007327282B2

(12) United States Patent
Crocker et al.

(10) Patent No.: US 7,327,282 B2
(45) Date of Patent: Feb. 5, 2008

(54) INFORMATION SYSTEM

(75) Inventors: Timothy R. Crocker, Exeter (GB); John D. Brandwood, Teignmouth (GB); Frank M. Bishop, Teignmouth (GB)

(73) Assignee: Last Mile Communications/Tivis Limited, Devon (GB)

( * ) Notice: Subject to any disclaimer, the term of this patent is extended or adjusted under 35 U.S.C. 154(b) by 349 days.

(21) Appl. No.: 10/418,365

(22) Filed: Apr. 18, 2003

(65) Prior Publication Data
US 2003/0218551 A1 Nov. 27, 2003

Related U.S. Application Data
(62) Division of application No. 09/680,348, filed on Oct. 5, 2000, now Pat. No. 6,606,033.

(30) Foreign Application Priority Data

| | | | |
|---|---|---|---|
| Jun. 8, 1999 | (GB) | | 0014030.1 |
| Oct. 11, 1999 | (GB) | | 9924043.4 |

(51) Int. Cl.
*G08G 1/01* (2006.01)
(52) U.S. Cl. ............ 340/936; 340/901; 340/903; 340/905; 340/441
(58) Field of Classification Search ........... 340/901, 340/903, 905, 936, 438, 441, 988, 990, 539.1, 340/539.26, 576; 701/117, 119, 35, 23, 45, 701/208, 209
See application file for complete search history.

(56) References Cited

U.S. PATENT DOCUMENTS

| | | | | |
|---|---|---|---|---|
| 5,250,955 A | | 10/1993 | Major et al. | |
| 5,579,443 A | | 11/1996 | Tatematsu et al. | |
| 5,684,474 A | | 11/1997 | Gilon et al. | 340/903 |
| 5,819,198 A | | 10/1998 | Peretz | |
| 5,917,430 A | | 6/1999 | Greneker, III et al. | |
| 5,995,898 A | | 11/1999 | Tuttle | |
| 6,008,740 A | | 12/1999 | Hopkins | |
| 6,097,313 A | * | 8/2000 | Takahashi et al. | 340/905 |
| 6,107,940 A | * | 8/2000 | Grimm | 340/905 |
| 6,150,961 A | | 11/2000 | Alewine et al. | |
| 6,166,658 A | | 12/2000 | Testa | |
| 6,359,552 B1 | | 3/2002 | King | 340/436 |
| 6,388,578 B1 | * | 5/2002 | Fagan et al. | 340/901 |
| 6,466,862 B1 | * | 10/2002 | DeKock et al. | 701/117 |
| 6,707,391 B1 | * | 3/2004 | Monroe | 340/901 |

FOREIGN PATENT DOCUMENTS

| | | |
|---|---|---|
| DE | 43 04 094 | 8/1994 |
| EP | 0 817 151 | 7/1998 |
| EP | 0 869 466 A1 | 10/1998 |

OTHER PUBLICATIONS

International Search Report of corresponding PCT application No. PCT/GB00/03626, filed Sep. 21, 2000; Report dated Jan. 25, 2001.

\* cited by examiner

*Primary Examiner*—Hung Nguyen
(74) *Attorney, Agent, or Firm*—Marshall, Gerstein & Borun LLP

(57) ABSTRACT

An information system is provided for transmitting data into a local area surrounding the transmitter. The transmitter may be used to provide information to pedestrians, or to passing road traffic. Data is stored in a local memory 64 associated with the transmitter such that data stored in the memory can be repeatedly and frequently transmitted to users 70 having suitable reception apparatus 18 in the vicinity of the transmitter.

11 Claims, 3 Drawing Sheets

INFORMATION SYSTEM

CROSS REFERENCE TO RELATED APPLICATION

This is a divisional patent application of U.S. patent application Ser. No. 09/680,348 filed on Oct. 5, 2000 now U.S. Pat. No. 6,606,033.

FIELD OF THE DISCLOSURE

The present invention relates to an information system, and in particular to a local information system which may be used by pedestrians or as a vehicle information system. Such an information system may be arranged to provide data concerning local services, may allow local businesses to advertise or may advise the locally pertaining speed limits to the driver of a vehicle. The system may be used in some pedestrian environments, for instance airports or railway stations, to deliver relevant contextual information such as timetables, arrival and departure data and so on.

BACKGROUND OF THE DISCLOSURE

There have been proposals to crack down on speeding. There has even been a suggestion of zero tolerance of minor speed violations. In the United Kingdom, the Council for the Protection of Rural England is calling for a 40 mph speed limit on rural roads. Reductions in speed limits on roads are often largely ignored since drivers have become used to travelling on the road at the higher speed limit. Furthermore, local driving culture may be such that speed limits are generally ignored. In the UK for example, a great deal of motorway traffic travels at between 80 and 85 mph.

Police forces have already installed speed cameras in order that speeding motorists can be photographed and have points awarded to their licence or fines imposed without the need for intervention by a policeman. Conventional film based cameras have tended to have a margin of tolerance set into them in order that they only catch the worst offenders and thereby can be expected to have a reasonable lifetime before the film needs replacing. Film based cameras are slowly being replaced by digital cameras which do not have the same data storage problems. Furthermore, if the cameras have a telecommunications link then they are able to capture an image of every speeding vehicle that goes past them. If such cameras are set to a zero tolerance limit, it becomes entirely feasible for a driver committing only minor speeding offences to achieve sufficient speeding violations within a single journey to lose his license without him ever being aware of it.

Such a zero tolerance regime might result in many drivers spending a considerable amount of time looking at their speedometer and consequently less time looking at the road. Furthermore, excessively cautious drivers may drive at a larger margin below the actual speed limit causing unnecessary congestion, possibly frustration amongst other road users and even additional accidents.

For the rigid enforcement of speed limits, there are two numbers that the driver needs to know. These are what the local speed limit is, and the vehicle's speed is. Whilst the UK has, in general, a reasonably good sign posting system, it is always possible to miss a road sign when the driver's attention is directed elsewhere. This may be because of local traffic conditions requiring driver attention. Furthermore, it is not uncommon, especially on rural roads, for road signs to become obscured by overhanging trees in the summer or to appear as silhouettes when driving into bright sunlight. There has also been a tendency to increase the number of roadside signs, and this may increase further if roadside advertising or sign sponsorship is allowed, thus giving the driver far more peripheral and nonessential information to sift through before he can identify the local speed limit.

In the car, the speedometer is the most visible of instruments, but it is still provided in an instrument binnacle which requires the driver to avert his eyes from the road and to refocus on the distance to a few feet in front of him in order to read the vehicle's speed. Often an experienced motorist knows his approximate speed by the sound of the engine of his car. Where some minor speeding is tolerated, this is a sufficiently accurate technique for a motorist to regulate his road speed. However, if a zero tolerance regime is enforced, then the motorist can no longer rely on this audio clue, and will be forced to examine his speedometer far more frequently and consequently be looking at the road less frequently.

SUMMARY OF THE DISCLOSURE

According to a first aspect of the present invention, there is provided a vehicle information system comprising a receiver responsive to local data transmissions from roadside transmitters and an audio and/or visual communications device for communicating information to a vehicle's occupant.

It is thus possible to provide an information system which is responsive to roadside transmitters in order to capture and hold data which may, for example be indicative of the local speed limit. Preferably the information system is arranged to receive broadcast data representative of at least a local speed limit. The information system, or some other vehicle system, can be arranged to compare this speed limit information with locally derived data representative of the vehicle's speed and to indicate to the occupant, preferably the driver, the result of the comparison. Thus, for example, a warning may be issued to the driver if he is at or exceeding the speed limit. Additionally, an advisory warning may also be issued if the driver is close to the limit, for example in excess of 95% of the speed limit. Additionally or alternatively data representing the local speed limit may be provided to a vehicle's engine management system or cruise control system so as to cause the vehicle to automatically stay within the speed limit until the driver intervenes to deliberately exceed the limit for example by switching the speed control system off or by "kicking down" the accelerator in a manner similar to that used to force a gear change in automatic vehicle boxes.

Preferably the receiver is a forward looking receiver. The receiver advantageously has a narrow acceptance aperture such that it is substantially responsive only to signals coming from an expected direction with respect to the vehicle. Thus if the receiver has a restricted acceptance aperture in the horizontal plane it can be arranged to receive data from roadside transmitters as the vehicle approaches them. The acceptance in the vertical plane may need to subtend nearly 90° such that it can accept signals from transmitters mounted near the roadway or on buildings or on gantries extending over the road. In the UK, where vehicles travel on the left hand side of the carriageway, the receiver may be squinted to look towards the left to a position where traffic information signs are normally located. In other jurisdictions, the receiver's antenna may have its primary lobe angled to the right.

Preferably the transmitter is arranged to transmit data representative of one or more of the local speed limit, distance to the next transmitter, emergency text messages, geographical data, transmitter identity data, local community data and advertisement data. This list should not be considered exhaustive.

Advantageously, in a radio or microwave based system, only a limited number of radio channels or microwave channels would be required due to the limited transmission range associated with each transmitter. In a preferred embodiment of the invention only one transmission channel (frequency) is required. This has the advantage of simplifying manufacture of the vehicle information system and enable communication between parts of, or parties using, the system, i.e. car to roadside, roadside to car, police to car, police to roadside and so on. However transmissions from vehicles to the roadside could be on different frequencies to transmissions from the roadside to vehicles.

By providing data indicating the distance to the next transmitter, the system can perform an integral data validity check to estimate if the current speed limit is likely to be valid. Thus if the distance travelled from the last transmitter to the present location exceeds the distance indicated as being the valid distance to the next transmitter, the system can assert a signal to indicate that the speed limit data that it currently holds should not be considered as accurate and the driver can then act accordingly. Additionally, a road side transmitter may be arranged to transmit a plurality of distance validity messages. These messages may be associated with directional information which can be interpreted with the aid of an on board direction detection system, such as a compass. The messages may also be associated with transmitter identity codes. In an extension of such a system, the system might also transmit the distance to side roads or junctions in order that warnings might be issued upon approach to a side road or junction. Additionally, such a system may also transmit data concerning the speed limit pertaining on that side road such that the driver or vehicle systems are pre-warned.

Advantageously, the signal transmitted by the roadside transmitters also provides some form of direction indicating or carriageway coding signal in order to alleviate potential problems from multiple reflections. Consider a carriageway that runs north-south. A vehicle travelling north should expect to receive data only from those transmitters more northerly than it. The transmitters for a northerly travelling vehicle would, of course, be facing south. Similarly, vehicles travelling southwards would expect to receive data from northward facing transmitter. However there is a potential that as a southward travelling vehicle approaches a northward facing transmitter, radiation reflected from the southward travelling vehicle could then be propagated towards a vehicle travelling northwards. Such a vehicle could then be presented with wholly inaccurate data. In order to overcome this problem, a direction signal may be incorporated, for example a compass bearing or range of compass bearings, such that vehicles travelling in that approximate direction know that they can accept the data transmissions as being valid, whereas vehicles travelling outside of that range of directions ignore the transmissions. Additionally, or alternatively a lane identification signal may be transmitted such that vehicles travelling along one carriageway respond to one of the lane identification signals and ignore data carrying an alternative lane identification signal. Additionally or alternatively, each transmitter may transmit its own identity code and may also transmit the identity code or codes of the succeeding transmitter or transmitters. Thus the vehicle's receiver is set up only to respond to the identity code of the next valid transmitter. In a variant of this system, each transmitter may transmit the identity codes of the adjacent transmitters of the neighbouring carriageway such that the vehicle is programmed to ignore transmissions emanating from those transmitters.

Capturing a transmitter identity code and associated positional information has further advantages. Given that the position of the transmitters are well known (because they are static objects for example affixed to road signs bridges or buildings) each transmitter can be correlated with its geographical position and acts as a way point. Vehicle navigation systems can then be programmed to navigate by reference to the transmitter identity codes. Such a system can be used as an adjunct to or alternative to GPS based systems. Advantageously the transmitters transmit their positional information in an explicit format. Thus for example each transmitter may transmit its latitude and longitude in a word such as:

<NAVWGS, LAT=51, 35.005N, LONG=05, 12.345W> where:

NAV indicates that positional information follows

WGS identifies the format of the information:

LAT=latitude

LONG=longitude.

Alternatively, where local mapping authorities have developed their own alternatives for specifying positions these can be used. Thus an alternative word might be:

<NAVUKMAPOS, SU 987123> where:

UKMAPOS specifies the coordinate system used on the ordnance survey maps in the UK, SU specifies the map area and the final 6 digits is a standard 6 digit positional reference.

As a further alternative, positional data may be given in a human readable form, for example:

<NAVTEXT, Passing through Kenton, South on A379>

Navigational systems based on the transmitter identity codes or explicit position data can be expected to outperform GPS based systems in urban areas where a GPS receiver may not be able to view sufficient GPS satellites simultaneously in order to calculate its position. Furthermore, GPS needs a digital map to convert its information into usable navigation data, and will fail in tunnels and intermittently in built up areas.

In contrast, urban areas are normally densely populated with sign posts so that the local transmitters can be arranged at frequent intervals.

Preferably a facility is also provided for local authorities and emergency services to add messages. Thus the police could introduce local speed limits in response to adverse road conditions or accidents. Similarly, a local authority and the community could piggyback local information into the system and traders could advertise their presence to passing motorists. The information that the transmitter is to transmit may be stored in a local memory, that is cached, and can be periodically updated.

Preferably the vehicle's information system also includes the transmitter. The transmitter may be used to identify the vehicle to the roadside receiver as the vehicle passes it. The or each roadside transmitter receiver unit may then be arranged to pass vehicle identity information or other data into a telecommunications network. Such a system may be used by fleet operators in order to track the location of their vehicles. Additionally or alternatively, security companies may also use it to track delivery vehicles or stolen vehicles. In a further extension of the system, once a stolen vehicle has been located, adjacent roadside transmitters may be arranged to transmit a disable code targeted at that vehicle in order to cause the vehicle's engine management system or other system to limit the vehicle speed or to shut it down completely. Advantageously the retransmit feature and response to certain instructions can be wholly or partially disabled under control of the driver, although deactivation may require the use of security means, such as passwords.

The system may also be used for automatic road tolling or controlled access to roads or spaces, such as car parks.

The system might further be used as an alarm, with a driver operated panic button being located within the passenger compartment. Thus the driver may activate a panic button to assert an emergency signal in those situations where the driver feels worried or intimidated, but nevertheless wishes to keep the vehicle moving, for example a road rage incident. A further panic button, or an output from a vehicle monitoring system such as an engine management system, deceleration sensor or air bag activation system, may be used to initiate an emergency broadcast message if the user or an automated system deems it appropriate.

Such a system may further be adapted to automatically transmit to the authorities when a speed violation above a certain threshold has occurred. Thus there is potential for a vehicle fitted with the system to automatically inform the authorities when the driver is speeding.

Preferably the data links between the roadside transmitter and the car are infrared or microwave links as these can be arranged to give line of sight coverage, thereby providing only local coverage. However, it is expected that microwave technology would be preferred as this has the potential to function in the mornings and the evenings when the sun is low at the horizon and might otherwise wash out infrared communication links.

Additionally or alternatively, magnetic data links may be provided. Thus transmission coils may be embedded adjacent to the road or in the road surface in order that vehicles can communicate with the coils as they pass over or adjacent them.

Advantageously a vehicle fitted with the system may also have a rear facing transmitter in order that it can transmit messages to a vehicle following it. Such a system may be used to daisy chain messages. Additionally or alternatively, the system may be used to enhance road safety. For example, a car fitted with the system may also include an accelerometer or other system able to judge when the car is undergoing severe braking, as might incur in an emergency situation. A message indicative of this may then be transmitted to following cars in order that the drivers can be alerted promptly or that in-car systems take control of the following vehicles and automatically decelerate them in order to reduce the chances of an impact.

Advantageously, each transmitter may be arranged to have a quiescent mode in which it transmits a carrier signal, possibly in association with other data, and vehicles and road side units can use the Doppler shift of the signal to estimate the vehicle's speed and/or relative speed. This speed data, and rate of change of speed data may be used to judge when a vehicle is speeding and/or undergoing rapid deceleration. Advantageously forward facing transmitters are distinguished from rear facing transmitters by identity codes thereby enabling an on board data processor to distinguish between signals from vehicles travelling in the same direction and those travelling in the opposite direction. The carrier signal may be transmitted continuously, or discontinuously but frequently.

The transmitter may also act in a RADAR mode, using microwave travel time to a vehicle and back to provide an estimate of range. The signals may be positively returned from vehicles, i.e. reflected, or actively retransmitted with data identifying the propagation delay introduced by the transmitter and receiver of the vehicle actively returning the signal.

According to a second aspect of the present invention, there is provided a roadside transmitter for use in association with a in-vehicle data system, the transmitter being arranged to transmit local road data to passing vehicles.

Advantageously a receiver is also provided, optionally in the road side transmitter, for receiving data transmitted from passing vehicles. Preferably the road side transmitter and receiver are associated with a controller which is also connected to a telecommunications network for exchanging data with a remote site.

According to a third aspect of the present invention there is provided a local area information system, comprising data transmitters having a memory for storing information relating to the local area and a plurality of user devices for receiving data from the transmitters and presenting the information to a user.

According to a fourth aspect of the present invention there is provided a transmitter for a local area information service, the transmitter comprising at least one of a microwave, radio, or ultrasonic or infrared transmission device, and a memory for storing information, said information by repeatedly retransmitted by the transmission device.

According to a fifth aspect of the present invention, there is provided a receiver responsive to data transmissions from local transmitters, and for storing the information in a local memory such that a user can select the information for presentation to the user.

It is thus possible to provide a information system which can provide information pertaining to the local area to a user. In particular the information may include advertisements from local shops or national brand owners.

The local transmitters may be in the form of posts or small transmitters attached to buildings or street furniture. Thus the information could be transmitted into a very small cell indeed, perhaps only of the order of 10's of meters across.

Advantageously the receiver constituting an embodiment of the present invention comprises a display device in co-operation with a local data processor. Indeed the receiver may comprise a portable computing device, such as a personal digital assistant or palmtop computer. Such a device can function in a pedestrian environment, and may also be used within the automotive environment.

Thus a single receiver or display device thereof can constitute a common component in an embodiment of the receiver according to the first aspect of the present invention and of the fifth aspect.

Indeed, it is expected that a device such as a small computer, personal digital assistant or the like may be used in a docking station when in a vehicle so as to receive data from the in vehicle receiver or transponder and to display it to the occupants of the vehicle. However, the same device may be removed from its docking station and use an inbuilt receiver or infrared port, or dock with portable receiver or transponder module, to allow information to be delivered in a pedestrian environment, such as shopping complexes, airports, bus stations, train stations, hotels, streets and the like.

The high data rates that can be supported in the local regions around each transmitter enables a vast amount of data to be transmitted to the receiver very quickly. Thus a user can quickly receive the data about product prices or promotions offered by a business. The data may be organised in a book like or other browsable form such that the user can sift through the information to select those portions of interest.

Preferably the receiver can also transmit data to the local area transmitters, and these are connected to a communication system such that enquiries can be made concerning information not stored in the memory of the local transmitter, but such that the information can be accessed via a broader network of computers. Thus a user is able to access data across, for example, the Internet.

Preferably the receiver's bi-directional communication link with the local area transmitters has sufficient bandwidth to support voice communication either in place of or simultaneously with data and/or video transmission. Thus the hand held receiver can act to accept data from the local transmitter for which the recipient need not pay, and also make use of more specific services such as internet access, voice or videophone for which the user may pay or may not pay.

Thus a receiver constituting an embodiment of the present invention may provide the functionality of the WAP mobile telephone. However, whereas a WAP telephone user has to dial out to browse the internet to obtain data such as local restaurant menus, bus time tables and so, the present invention makes that information continuously available from the local transmitters.

The information may be categorised by topic using embedded tags, such as meta tags, which may be used to present data to the user in a structured manner. Since the memory capacity of the local transmitter may be larger than that of the receiver unit, the receiver may conserve its memory resource by capturing only portions of the data, such selection being done on the basis of the embedded tags. The high repetition rate of data transmission from the local transmitter ensures that the data which was not captured will be available without a significant delay should the user become interested in it.

According to a sixth aspect of the present invention, there is provided a method of making data available to at least one user, the method comprising the steps of holding data in a memory within a transmitter arranged to transmit data in a region surrounding the transmitter; and repeatedly transmitting the data held in the memory into the region such that a suitable receiver within the region can make the data available to a user.

Preferably the data is categorised such that it is presented in a sortable or indexed format.

Preferably the data includes advertisements.

Preferably the advertisers pay for advertising "space" so as to subsidise, or render free, the cost to the user for receiving some or all of the data transmitted from the transmitter.

BRIEF DESCRIPTION OF THE DRAWINGS

The present invention will further be described, by way of example, with reference to the accompanying drawings, in which.

DETAILED DESCRIPTION OF THE DISCLOSURE

Figure 1:
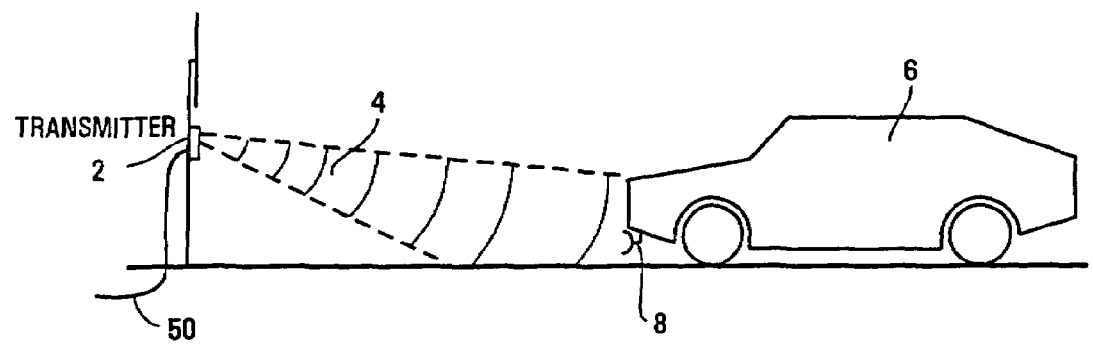
FIG. 1 schematically illustrates a vehicle approaching a roadside transmitter.
Figure 2:
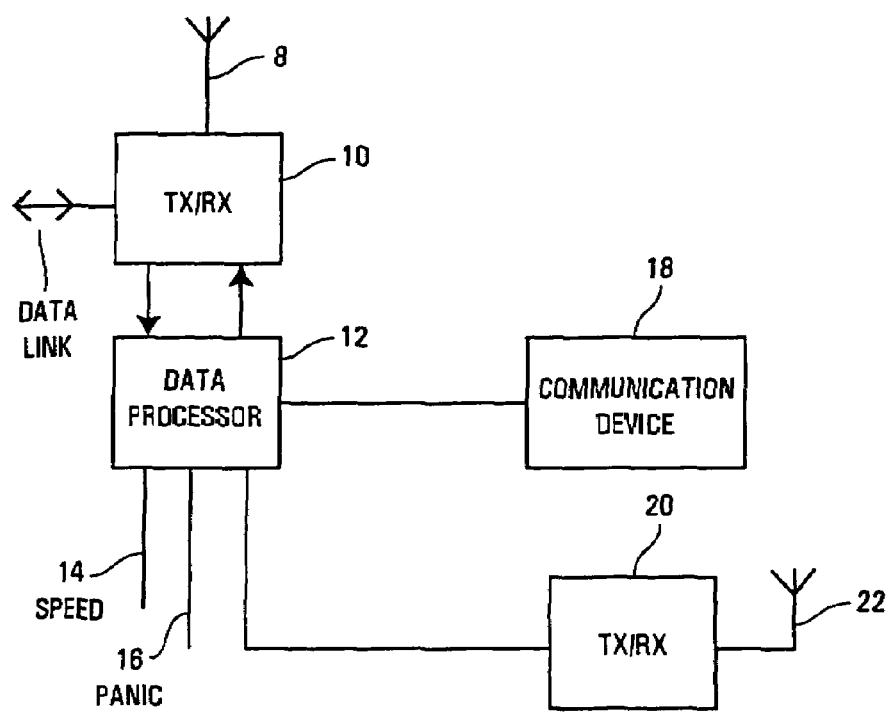
FIG. 2 schematically illustrates the components within an in-vehicle information system.

As shown in FIG. 1, a roadside transmitter 2 constituting an embodiment of the present invention is located adjacent a carriageway such that it emits a well defined radiative beam 4 which can be received by oncoming vehicles 6. The radiative beam 4 is ideally transmitted in the form of a narrowly diverging cone such that it is only received by oncoming vehicles and has little chance of being received by vehicles travelling on the other carriageway. The vehicle 6 carries a directional antenna, schematically illustrated as 8 which faces forwardly, but may be angled to one side slightly in order to face the expected direction of the oncoming transmitters as the vehicle travels. The transmitter 2 may be placed on any convenient housing or support beside the carriageway, but most conveniently may be incorporated within pre-existing street furniture such as road signs, or "belisha beacons" used to signal the presence of pedestrian crossings. When the transmitter is associated with a pedestrian crossing, for example an automated pedestrian crossing where the pedestrian must request permission to cross the road and then is expected to wait until traffic lights have inhibited oncoming traffic, the transmitter may be arranged to set a special signal indicating when the lights are red. Similar systems may be incorporated with traffic lights in order to reduce the likelihood of a driver jumping the lights. The forward facing antenna is connected to a receiver 10 which may optionally include a transmitter. The receiver 10 is connected to a data processor 12 which is also arranged to receive other signals from vehicle systems, for example an indication of current vehicle speed via input line 14 or a signal from a panic switch via input line 16. Other signal inputs may be provided. The data processor 12 is arranged to receive signals from the receiver 10 indicating the current speed limit and the distance to the next transmitter. Using an internal clock and the speed information, the data processor 12 is able to integrate the speed with respect to time in order to determine the distance travelled by the vehicle since it passed the last transmitter. The transmitter's signals may be receivable by the vehicle over a range of several tens of metres as it approaches the transmitter. Nevertheless, the data-processor 12 can accurately estimate when the vehicle is about to pass the transmitter since the signal will abruptly fade to zero. The data processor can use this as an indication that it should now start its distance travelled calculations in order to determine when it should detect the next transmitter 2. The data-processor 12 is also arranged to compare the current speed with the limit speed and to issue a warning to a driver via a communications device 18 in the event that the driver is exceeding the speed limit. The communications device 18 may emit an audible tone whose frequency or amplitude may vary with the severity of the amount by which the driver is exceeding the current speed limit.

Advantageously the system is arranged to transmit an unobtrusive and intermittent rest tone to indicate to the driver that the system is working and that it regards its current data as being in good order. The communications device 18 may also include a display screen or other visual display (for example a head-up display) such that text messages can be presented to the driver. The text messages could warn of adverse road conditions, such as flooding or other obstructions on the carriageway. Such messages would by their very nature be delivered local to the obstruction and would therefore be credible and be responded to by the driver.

The data processor 12 may also be arranged to communicate with a second transmitter 20 having a rear facing antenna 22. The data processor may be arranged to daisy chain some of the signals it receives by re-transmitting them via the rear facing antenna 22. Additionally the vehicle 6 may carry a deceleration monitor such that emergency braking of the vehicle can be detected. The data processor 12 may be responsive to this emergency deceleration signal and may transmit a signal to following vehicles indicative that its vehicle is undergoing heavy braking. Vehicle control systems of vehicles fitted with this system may be arranged to undertake preventative actions and to decelerate the vehicle in the event that they receive such an emergency heavy braking signal from a preceding signal. A receiver may be associated with the rear facing antenna 22 such that, for example, law enforcement vehicles chasing a stolen car may transmit instructions to the vehicle's engine management system in order to degrade its performance, issue an alert to the driver, or switch the vehicle's engine off.

Figure 3:
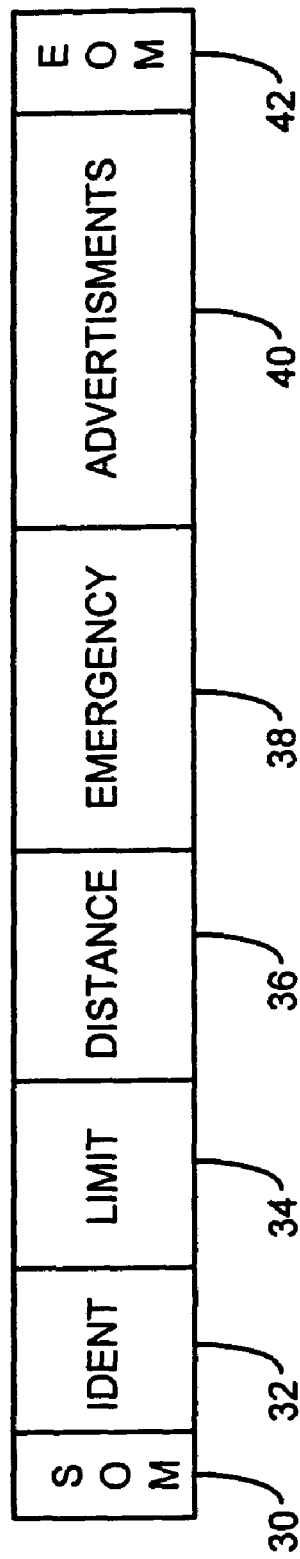
FIG. 3 schematically represents a data word used by an embodiment of the invention.

FIG. 3 schematically illustrates a data word which may be transmitted by the roadside transmitters 2 and received by the vehicle 6. The data word advantageously starts with a start of message marker 30 in order that the data processor 12 can synchronise with the word. Following the start of message marker, a transmitter identity 32 may be transmitted which enables the vehicle to ascertain where it is. In the event that a vehicle fitted with this system breaks down, the driver may obtain from the information system the identity of the last transmitter that it passed and this information can be relayed to the recovery services in order that the position of the vehicle can be identified with great accuracy. Following the identity code 32, the local speed limit "limit" is transmitted in word 34. This word is captured by the data processor 12 and latched until such time as it is updated by the next transmitter that the vehicle passes or becomes expired due to time or distance travelled. The next word 36 gives an indication of the distance from the current transmitter to the subsequent transmitter. As noted hereinbefore, the vehicle can then calculate the distance that it has travelled in order to determine if its current speed limit can still be believed, i.e. because it has covered less ground than the distance contained in word 36, or if it has travelled significantly further than that distance, to indicate that it has lost the local speed limit information. Word 38 is reserved for emergency messages which may be textural messages presented to the driver. However, if word 38 includes its own start and end of word markers such that it can be of any length, then audio messages can be transmitted. Additionally, a predefined set of textural and audio messages may be stored in the information system, and an identity code may be transmitted in word 38 in order that the correct message is selected and played to the driver. Finally, an advertisements and/or commercial information field 40 is provided before the end of message marker 42.

Each transmitter 2 may be connected to a local controller (not shown) or a remote controller (not shown) via a communications link, such as the wire link 50 schematically illustrated in FIG. 1. However radio technology, for instance cell phones, may be used to link the roadside transmitter and associated data processor to a control node.

In systems employing bi-directional communication, the data processor 12 may be arranged to transmit a vehicle identity via a forward facing transmitter and forward facing antenna to the roadside unit 2. Alternatively a vehicle can use a rear facing transmitter. Thus such a vehicle receives information as it approaches a roadside unit and sends information after it has passed the roadside unit. This can then communicate with its local controller in order to indicate which vehicles have passed it and what time. The vehicle may optionally signal its speed and whether its driver has committed a sufficiently gross speeding offence for this to be automatically notified to the authorities. This data can then be made available in order that vehicles can be tracked.

Advantageously the or each roadside transmitter incorporates a roadside data terminal or communications port such that the relevant authorities could perform in situ reprogramming of the speed limit or other messages delivered from the unit to oncoming vehicles. Additionally the primary microwave link to vehicles could be used by police or other authorities to update the transmitter with messages written from authorised vehicles when they are near or passing a road side unit. Security codes can ensure that only the authorised person can change the messages.

In order to overcome problems of reflected signals, a valid direction signal may also be included. The signal may transmit minimum and maximum bearings through which its speed data can be regarded as valid, or may transmit a nominal direction and upper and lower limits such that vehicles travelling within the bearings defined by this range can regard the incoming data as valid. In order to use such a system, the data processor 12 would need to be responsive to a magnetic compass such as a simple two axis flux gate compass which could be integrated easily into the vehicle.

Signals from roadside transmitters when direction information is unambiguous may be arranged to transmit specially coded information in order to allow on board compasses to undergo calibration.

Advantageously the transmitters retransmit their data regularly, for example every half a second, such that a vehicle approaching a sign should have multiple opportunities to capture the incoming data.

In embodiments of the invention in which the vehicle is allowed to daisy chain the signals, the data processor is ideally arranged to generate a random delay period before re-transmitting the information. The introduction of a random delay should ensure that two vehicles do not repeatedly attempt to transmit at the same time to other vehicles. In the event that multiple broadcasts are received simultaneously or near simultaneously, the data processor may be arranged to perform some arbitration algorithm in order to decide which message it will rely upon. In embodiments of the invention where a vehicle is allowed to daisy chain messages, a further algorithm is employed within each data processor to enable the control of the geographical extent of any daisy chain alarm message. The originating vehicle of the message will include a data tag within the message which indicates the time that the message was sent and position information. The tag will also label the message as being a first generation message. Vehicles receiving the message will introduce a random delay before subsequently transmitting the message in order to avoid retransmitting a copy on top of one another. Any vehicle receiving a first generation message will retransmit the message, but increasing the generation number tag to show that the message is now a second generation message. However, vehicles receiving second and higher order generation messages will determine whether or not to retransmit the message according to parameters that are set in a retransmission algorithm. Any message which is retransmitted will again have its generation tag incremented. Thus, for instance, vehicles may retransmit the message if the number of retransmissions is statistically low, thus ensuring the best chance that the message will propagate backwards. Vehicles receiving a high statistical message rate will retransmit according to random parameters so that some vehicles retransmit and some vehicles do not. This ensures that the message continues at a high statistical retransmission rate but does not grow so rapidly such as to swamp the system. Vehicles receiving messages where the generation number exceeds a predetermined limit, or where positional information indicates that they are at a sufficient distance from the geographical source of the message that it is unlikely that the vehicle or following vehicles are in danger will not retransmit the message or may modify the message to send it as a lower urgency alert message.

Vehicles receiving early generation messages may retransmit the alarm message from their front facing antennas as well to roadside transceivers until such time as they receive an acknowledgement from a highway control centre that the information has been received. Such alerts reaching the relevant authorities can be used to place warning alerts in the messages within other roadside equipment that lie before the position of the accident or incident, and by the use of authorisation codes can be used to cancel the vehicle's daisy chain mode of message propagation. The parameters that control the algorithm's operation may be modified from roadside sites allowing traffic control or other authorities the ability to tailor the behaviour of the system, for instance to adapt it to different traffic flows or weather conditions.

In rural areas, roadside transmissions may be infrequent. However, each vehicle may intermittently transmit from its forward facing and backward facing transmitters. This has a safety feature of advertising the presence of the vehicle to other vehicles, such that each vehicle can use this information for collision avoidance calculations. The transmitters may also operate different power levels, i.e in a "whisper-shout" mode such that the approximate distance can be determined to near vehicles. Advantageously, each transmitter sends a code to indicate its power level of transmission. Individual coding schemes and random delay sequences allows many vehicle information systems in range of each other to operate concurrently with statistically negligible chance of mutual interference.

Advantageously the in vehicle receiver is provided with a data port such that external devices can read received messages and transmit their own messages. Existing standards such as RS232 or USB may be used, although the choice of interface is not important.

The data word, shown in FIG. 3, may support coding or message formats such as HTML. This may permit on board message or data systems, or portable devices such as lap top computers, to display or react to the message content. This may be used in local advertising systems or third party navigation systems or fleet management systems.

In urban areas, the distance between data links may be short—both in time and distance. Packet communication schemes may use the high bandwidth of the microwave system to transmit and receive data. The microwave link can be expected to support data rates of 10 M Bits per second and above. This is far in excess of the data rates achievable by cellular telephone systems at present.

Given that only very few vehicles are within communication range with a given roadside unit at any one time, the available bandwidth can be time shared to give very high data-rate communications between a vehicle and a communications network. Data links to roadside units would need to support these data rates, which are easily within the capability of fibre optic transmission systems.

The data exchange capability could be used to provide a telephone or video phone system, or in car entertainment on demand by download of games, music or video.

As noted hereinbefore, the system may be arranged to give audio messages to a driver which may indicate when he has exceeded the speed limit. The system may also give intermittent messages confirming that it is functioning and may also give messages indicating when the driver is below the current speed limit but close to it. The driver may select the percentage of the current speed limit which triggers such a message. Additionally the system may also be arranged to give positional information if so requested as it passes each sign for example of the form "entering Kenton 5 miles south of Exeter on A379". It is thus possible to provide an in-vehicle data system, co-operating with a roadside network of transmitters to exchange data between the transmitters and the car and optionally from the vehicle to the roadside units in order that speed limits and other useful data can be made readily available.

The system naturally extends beyond the vehicle environment. Portable data processing and display units—such as palm top computers and personal digital assistants—can receive data from local area transmitters and display it to a user.

Figure 4:
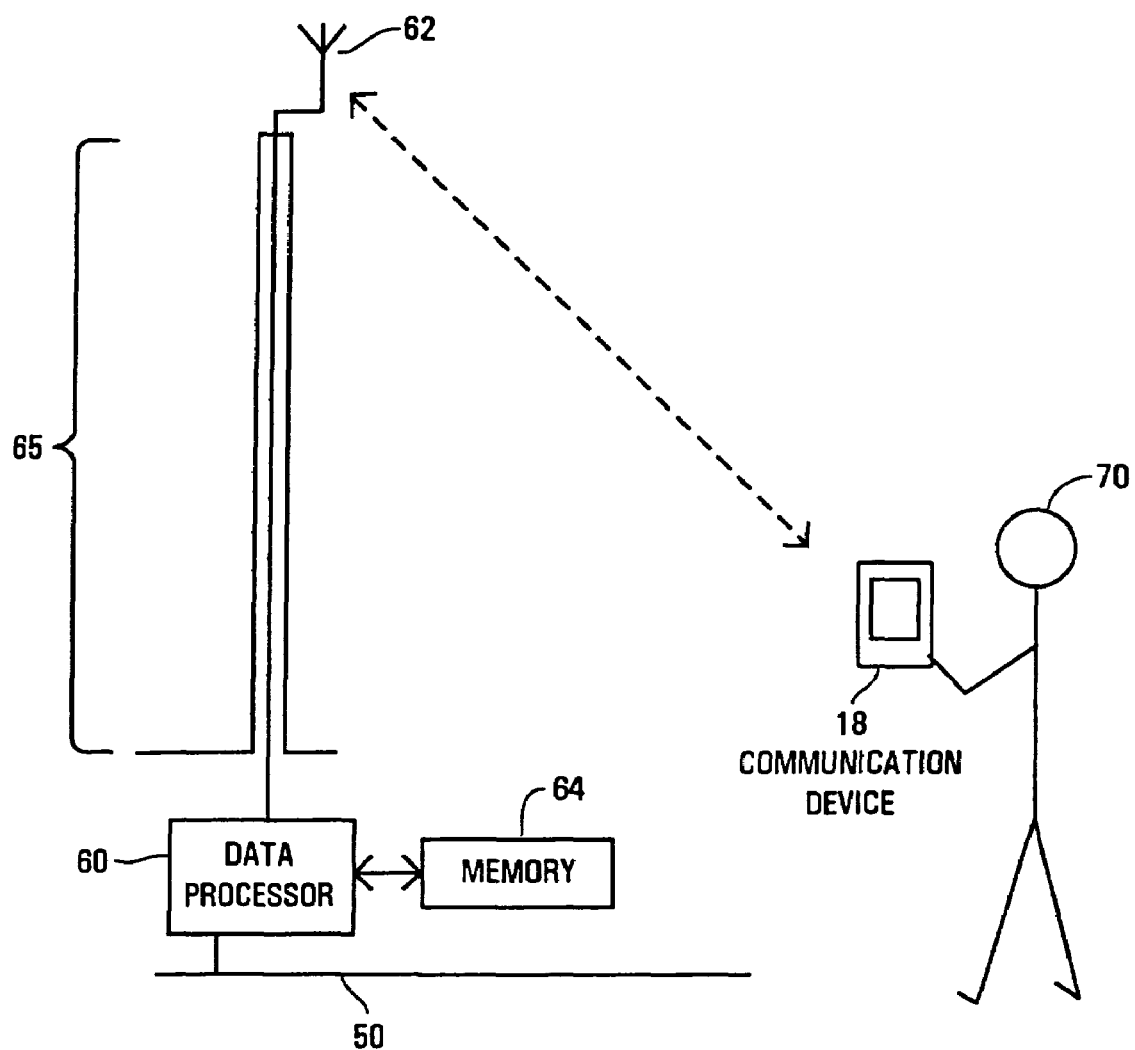
FIG. 4 schematically illustrates a data system for use in a pedestrian environment.

FIG. 4 schematically illustrates a pedestrian equivalent of the motor vehicle system illustrated in FIG. 1. It will be appreciated that many components are shared by each system and that the vehicle and pedestrian distinction is in fact minimal.

A local data node, generally designated 65, comprises a data processor and receiver/transmitter 60 connected to an antenna 62 which may be a microwave antenna, a radio antenna or an infrared or ultrasonic communications device. The antenna may be provided in the centre of a "cell" over which the transmissions from the antenna may be received. The size of the cell may can be controlled on the basis of positioning, power level and so may range from a few meters to hundreds of meters across or more.

The data processor 60 interfaces with a memory 64 which stores the data to be transmitted. The data may include community information, advertisements from local stores, advertising from more distant commercial concerns, menus from local restaurants and so on, and may be encoded such that it can be received and presented in a convenient form. Thus, the data may, for example, be presented in HTML format such that a portable computer running a standard browser format can display the information.

The use of a local memory 64 means that vast amounts of data can be cached in the transmitter and can be repeatedly retransmitted. The data processor 60 may also be in communication with a further communication channel, shown as a cable 50, but which may also be a radio link to another computer such as that of an internet service provider. This further communication link can be used by a system administrator to refresh the data held in the memory 64 and also to support bi-directional transfer of data. Thus a user having a suitably equipped portable computer or dedicated terminal may wish to access information not held in the loca cache—i.e. in memory 64. The user can request such information and the data processor 60 can send a request for the information over the further communication link. Thus a user 70 can surf the internet or establish other bi-directional communications, such as e-mail, telephone conversation or video link via the local data node 65. Given that the cells can be quite small, the number of users trying to establish concurrent bi-directional communication is likely to remain small so each user should maintain a reasonable data rate.

The use of a data cache within each fixed transmitter has several advantages. An important one is the fact that it acts to "decouple" the speed limitations of the link 50 in the fixed telecommunications network from the speed of transmission to the user 70. It also enables data transfer to the cache to be transmitted at whichever transfer rate is available. Data for the cache can be transferred via very slow links since little of it will change over a period of days or weeks. When changes are made, these may typically involve only small sections of the data so again a slow data link will be adequate and will not prevent the total store of data within the cache from being continually up to date. The data when the cache can also be modified to allow urgent messages and updates to be rapidly propagated. This is a useful distinction to the WAP enabled cellular telephone technology where each user is limited by the speed of the transmission of the link and for every sort of data communication, all of the data is transmitted individually to each user. In the system described herein, the speed of the link to the fixed telecommunication network is only relevant to the user when he wants to use the system as a link to this network, for example when using internet facilities or sending e-mails. Thus the use of the available transmission spectrum and bandwidth is much enhanced in systems constituting embodiments for the present invention.

The pedestrian and in vehicle systems may utilise the same display unit 18. The unit 18 may sit in a docking station and communicate with the vehicle's data processor via an infrared data link or via direct electrical connection. The same unit 18 can communicate with the data node 65 via its inbuilt IR Link, an inbuilt transceiver or via connection to an add on module.

Such a system gives access to a variety of services and information. It also provides a continuously available update of contextual information related to the user's current geographical position.

Furthermore the system is robust since each local area transmitter/data node 65 contains cached local information and can work autonomously if a centralised network computer fails.

The system can use the exceptional bandwidth of microwave communication systems to provide rapid internet access or video access. Furthermore, each transmitter may be subdivided into a plurality of zones—each being covered by its own antenna so as to further enhance its capability for multi-user access. Each zone, and indeed each transmitter, can engage in communication of specific data to a specific user and consequently provision must be made to hand over the data communications from one zone to a next or one transmitter to another as a user wanders around. However, technology of this type is already established for use with mobile telephones and does not constitute part of the present invention.

It is thus possible to provided a data system which can be used to provide updatable information which is based on a user's geographical position. Thus a user may receive local adverts from shops and may even query local shops to obtain prices of goods or directions within a shop as to where to find the goods. The cell size can deliberately be maintained small, for example 10 meters or so, such that information can be very specific.

The invention claimed is:

1. A local area information system, comprising at least one transmitter connected to a data network, said at least one transmitter having a memory for storing information relating to the local area, and a plurality of portable user devices for receiving the information from the at least one transmitter and presenting the information to a user, wherein the user device is arranged to receive information from the at least one transmitter and to present selected parts of it to a user, wherein each user device includes a user device transmitter such that a user can establish bi-directional communication to access the data network via the at least one transmitter to request information when the requested information is not held in the memory of the at least one transmitter.

2. A local area information system as claimed in claim 1, wherein the data includes at least one of advertisements and local information.

3. A local area information system as claimed in claim 1, where a transmitter is attached to one of a post, a building and street furniture.

4. A local area information system as claimed in claim 1, wherein each transmitter serves a cell of the order of tens of meters from side to side.

5. A local area information system as claimed in claim 1, wherein a user device comprises a display device cooperating with a portable data processor.

6. A local area information system as claimed in claim 1, wherein the data is organized in a browsable form such that a user can search through the information to select items of interest.

7. A local area information system as claimed in claim 1, wherein the user device supports at least one of bi-directional audio and video data transmission to the at least one transmitter.

8. A local area information system as claimed in claim 1, in which contextual information related to a user's position is updated based on a user's current geographical position.

9. A local area information system as claimed in claim 1, in which the system is adapted to engage in communication specific to a specific user and to hand over the communication from one transmitter to another as the user moves around.

10. A local area information system as claimed in claim 9, in which the local area information system is adapted to act as at least one of a telephone system, a videophone system, a music delivery system and a video delivery system by utilizing the communication link between the at least one transmitter and the user device.

11. A local area information system data node comprising a transmitter, a receiver, a local memory and a further communication device for establishing communication with a computer having access to the Internet, wherein the local memory stores data, and wherein a local area information node is, in use, further arranged to establish wireless communication with a user device such that the user can receive information from the local memory when the information that the user wants is stored in the local memory, and the user can access information via the further communications device when the information is not stored in the local memory.

* * * * *